(12) United States Patent
Venkataraman et al.

(10) Patent No.: US 10,049,386 B1
(45) Date of Patent: Aug. 14, 2018

(54) ADJUSTING CONTENT SELECTION BASED ON SEARCH RESULTS

(71) Applicant: Google Inc., Mountain View, CA (US)

(72) Inventors: Shivakumar Venkataraman, Santa Clara, CA (US); Tarun Kumar Jain, Sunnyvale, CA (US); Srdjan Petrovic, Palo Alto, CA (US); Arnar Mar Hrafnkelsson, Los Altos, CA (US); William S. Robinson, Chicago, IL (US); Alan Blount, Cambridge, MA (US); David L. Jones, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 273 days.

(21) Appl. No.: 14/022,653

(22) Filed: Sep. 10, 2013

(51) Int. Cl.
*G06Q 30/02* (2012.01)

(52) U.S. Cl.
CPC ..... *G06Q 30/0256* (2013.01); *G06Q 30/0251* (2013.01); *G06Q 30/0277* (2013.01)

(58) Field of Classification Search
CPC combination set(s) only.
See application file for complete search history.

(56) References Cited

U.S. PATENT DOCUMENTS

| | | | |
|---|---|---|---|
| 2005/0071325 A1* | 3/2005 | Bem | 707/3 |
| 2006/0004732 A1 | 1/2006 | Odom | |
| 2007/0124425 A1* | 5/2007 | Gross | 709/217 |
| 2008/0104224 A1* | 5/2008 | Litofsky | G06F 17/3089 709/224 |
| 2009/0006365 A1* | 1/2009 | Liu | G06F 17/30864 |
| 2010/0235241 A1* | 9/2010 | Wang et al. | 705/14.66 |
| 2012/0030185 A1* | 2/2012 | Gnanamani | G06Q 30/02 707/706 |
| 2013/0018723 A1* | 1/2013 | Khanna | 705/14.49 |
| 2013/0246167 A1* | 9/2013 | Qin et al. | 705/14.46 |
| 2014/0282006 A1* | 9/2014 | Bolchini | H03L 7/07 715/728 |

OTHER PUBLICATIONS

Broder et al., "Search advertising using web relevance feedback," Oct. 26-30, 2008, ACM International Conference on Information and Knowledge Management (CIKM 2008), Retrieved from the Internet: <URL: http://fontoura.org/papers/cikm2008-onix.pdf>, 10 pages.

* cited by examiner

*Primary Examiner* — Fonya M Long
*Assistant Examiner* — Kyle G Robinson
(74) *Attorney, Agent, or Firm* — Fish & Richardson P.C.

(57) ABSTRACT

Methods, systems, and apparatus include computer programs encoded on a computer-readable storage medium for selecting content. A method includes: receiving an initial request for content that is to be presented along with search results responsive to a search request; identifying one or more eligible content items from the candidate content items that satisfy the initial request; receiving information describing the search results; re-processing the initial request using the information including one or more of adding other eligible content items, removing one or more previously eligible content items, adjusting a quality score or a bid associated with one or more eligible content items, or re-ranking the eligible content items; conducting an auction based on ranked eligible content items; and selecting one or more content items from among the eligible content items based on the results of the auction and transmitting the selected one or more content items.

19 Claims, 4 Drawing Sheets

ADJUSTING CONTENT SELECTION BASED
ON SEARCH RESULTS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for selecting content. A method includes: receiving an initial request for content that is to be presented along with search results responsive to a search request that is received from a user device, the initial request including one or more selection criteria for evaluating candidate content items; processing, by one or more processors, the initial request including identifying one or more eligible content items from the candidate content items that satisfy the initial request; after receiving and processing the initial request and identifying one or more eligible content items, receiving information describing the search results; re-processing the initial request using the information including one or more of adding other eligible content items, removing one or more previously eligible content items, adjusting a quality score or a bid associated with one or more eligible content items, or re-ranking the eligible content items; conducting an auction based on ranked eligible content items; and selecting one or more content items from among the eligible content items responsive to the initial request based on the results of the auction and transmitting the selected one or more content items.

In general, another innovative aspect of the subject matter described in this specification can be implemented in systems. A system includes a search system and a content management system. The content management system is configured to: receive an initial request for content that is to be presented along with search results generated by the search system, the search results responsive to a search request that is received from a user device, the initial request including one or more selection criteria for evaluating candidate content items; process the initial request including identifying one or more eligible content items from the candidate content items that satisfy the initial request; after receiving and processing the initial request and identifying one or more eligible content items, receive information from the search system describing the search results; re-process the initial request using the information including one or more of adding other eligible content items, removing one or more previously eligible content items, adjusting a quality score or a bid associated with one or more eligible content items, or re-ranking the eligible content items; conduct an auction based on ranked eligible content items; and select one or more content items from among the eligible content items responsive to the initial request based on the results of the auction and transmitting the selected one or more content items.

In general, another innovative aspect of the subject matter described in this specification can be implemented in computer program products. A computer program product tangibly embodied in a computer-readable storage device comprises instructions. The instructions, when executed by a processor, cause the processor to: receive an initial request for content that is to be presented along with search results responsive to a search request that is received from a user device, the initial request including one or more selection criteria for evaluating candidate content items; process, by one or more processors, the initial request including identifying one or more eligible content items from the candidate content items that satisfy the initial request; after receiving and processing the initial request and identifying one or more eligible content items, receive information describing the search results; re-process the initial request using the information including one or more of adding other eligible content items, removing one or more previously eligible content items, adjusting a quality score or a bid associated with one or more eligible content items, or re-ranking the eligible content items; conduct an auction based on ranked eligible content items; and select one or more content items from among the eligible content items responsive to the initial request based on the results of the auction and transmitting the selected one or more content items.

These and other implementations can each optionally include one or more of the following features. The one or more eligible content items that are identified prior to receipt of the information describing the search results can be ranked and re-processing can include re-ranking the eligible content items. The information can include the search results. Processing can include ranking the eligible content items and re-processing can include adding or removing one or more content items from the one or more eligible content items and re-ranking the then eligible content items. Re-processing can include adjusting a quality score of one or more content items upward or downward based on the information. Re-processing can include adjusting a bid associated with one or more eligible content items based at least in part on the information. Processing can include conducting an auction and re-processing can include re-running an auction based on the then available eligible content items. Re-running an auction includes re-running the auction with one or more of quality scores or bids associated with a given eligible content item being adjusted based on the received information. The initial request can include an indicator that further information will be made available for the selection of eligible content items. A selection can be finalized from among the eligible content items only after receipt of the information.

Particular implementations may realize none, one or more of the following advantages. A content management system can select content items that are relevant to a user's search query. A content sponsor can adjust a bid based on contents of search results. A content management system can perform processing of a request for content before receiving search result information and can re-process (e.g., from the beginning, or update processing, or continue processing) the request after receiving search result information, where such processing and re-processing can result in faster overall processing as compared to processing the request only after receiving search results information.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content management system can process a request for content that is to be presented along with search results, such as by identifying one or more eligible content items that satisfy the request. The content management system can, after receiving and processing the initial request and identifying one or more eligible content items, receive information describing the search results, such as from a search system. The content management system can re-process the initial request using the information, such as by adding other eligible content items, removing one or more previously eligible content items, adjusting a quality score or a bid associated with one or more eligible content items, or re-ranking the eligible content items. Re-processing can include picking up the processing that has been halted or otherwise delayed while waiting for the search results to be returned. In some implementations, an auction is conducted based on the remaining, ranked eligible content items. One or more content items can be selected from among the then eligible content items based on the results of the auction and the selected one or more content items can be transmitted to a user device which submitted the request for content.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
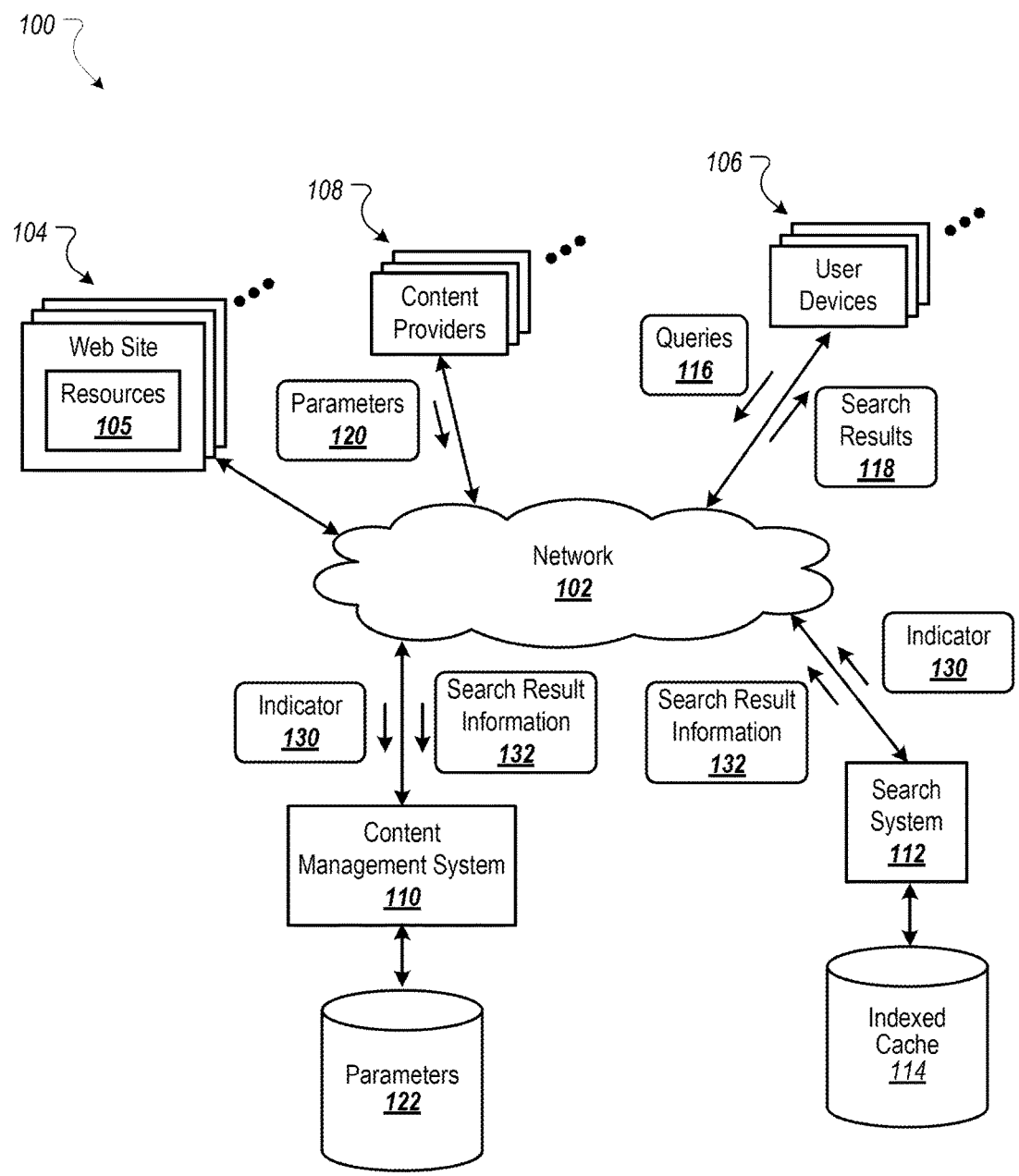
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, a search system 112 can, for example, access an indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms.

In response to receiving a search query 116, the search system 112 can submit an initial request for content to the content management system 110, where the initial request includes an indicator 130 that further information will be made available for the selection of eligible content items. The further information can be, for example, a set of search results 118 or information describing the set of search results 118. The content management system 110 can process the initial request for content, such as by identifying one or more eligible content items that satisfy the initial request.

The content management system 110 can, after receiving and processing the initial request and identifying one or more eligible content items, receive information 132 describing a set of search results 118, such as from the search system 112. The content management system 110 can re-process/update/continue processing the initial request using the received information 132, such as by adding other eligible content items, removing one or more previously eligible content items, adjusting a quality score or a bid associated with one or more eligible content items, or re-ranking the eligible content items. In some implementations, the content management system 110 can conduct an auction based on the remaining, ranked eligible content items. One or more content items can be selected from among the eligible content items, for example, based on the results of the auction and the selected one or more content items can be transmitted to the user device 106 which submitted the request for content, along with or in conjunction with the transmitting of the search results 118.

Figure 2:
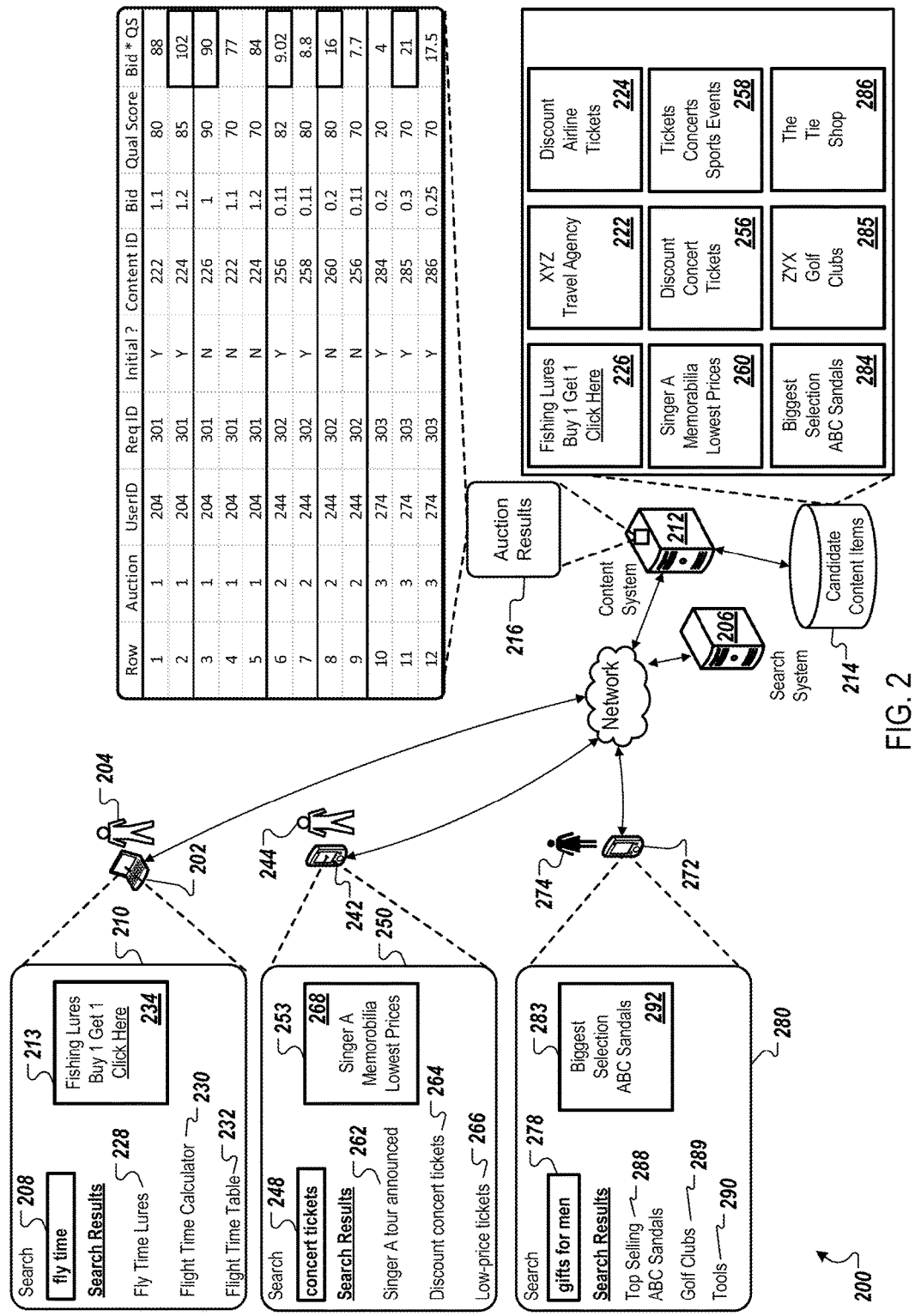
FIG. 2 is a block diagram of an example system for selecting content.

FIG. 2 is a block diagram of an example system 200 for selecting content. A user device 202 of a user 204 can send a search request to a search system 206. For example, the search request can include a search query 208 (e.g., "fly time") entered on a search page 210 that is presented on the user device 202. In response to receiving the search request, the search system 206 can send a request for content to a content management system 212, for one or more content items to be presented along with search results in response to the search request. For example, the request for content can be for a content slot 213. In some implementations, the request for content can be sent by the user device 202 to the content management system 212. The request for content can include the search query 208 as a selection criterion and can also include other selection criteria (e.g., an identifier of the user 204, the location of the user device 202). In some implementations, the request for content can include an indicator that further information, such as information relating to search results, may be subsequently made available for the selection of content items.

The content management system 212 can process the request for content, where the processing can include, for example, the evaluation of candidate content items 214 to identify one or more eligible content items. For example, the content management system 212 can identify eligible content items, conduct an auction using the eligible content items, and select a content item for the content slot 213 based on results of the auction. For example, content providers associated with the eligible content items can provide bids specifying amounts that the content providers are respectively willing to pay for presentation of their content items. In turn, an auction can be performed and the content slot 213 can be allocated to a particular content provider according, among other things, to associated bids and/or the relevance of a content item to the search query 208 and to other selection criteria. For example, the content slot 213 can be allocated to the content provider that provided the highest bid or a highest auction score (e.g., a score that is computed as a function of a bid and/or a quality score).

For example, the content management system 212 can conduct auctions which generate auction results 216. Example auction results included in the auction results 216 include rows one and two, which show highest and second-highest auction results, respectively, for an auction conducted in response to the request for content associated with the search query 208. For example, the row one entry indicates that an auction with an identifier of "1", which was an initial auction for the content request, was conducted, for a user with an identifier of "204", for a content request with an identifier of "301", where a content item with an identifier of "222" (e.g., corresponding to the content item 222) received an auction score of "88" (e.g., where the auction score was determined as a product of a bid of 1.1 times a quality score of eighty). The content item 222 is for a travel agency and the quality score of eighty may be determined, at least in part, based on the relevance of the travel agency content item to the search query 208 of "fly time".

The row two entry indicates that for the auction with the identifier of "1", an auction result of one hundred two was determined, for the user with the identifier of "204", for the content request with the identifier of "301", for a content item with an identifier of "224" (e.g., corresponding to the content item 224). In this example, the content item 224 received the highest auction score, as indicated by the rectangle outlining the highest auction result of one hundred two in the auction result cell in row two. The content item 224 is for a discount airline ticket seller, and the quality score of eighty five may be determined, at least in part, based on the relevance of the discount airline ticket seller content item 224 to the search query 208 of "fly time".

In response to receiving the search request corresponding to the search query 208, the search system 206 performs a search to identify a set of search results corresponding to the search query 208. For example, as shown in the search page 210, the search system 206 can identify search results 228, 230, and 232 (e.g., search results relating to "Fly Time Lures", "Flight Time Calculator", and "Flight Time Table", respectively). The search system 206 can send information describing the search results to the content management system 212.

The content management system 212, in response to receiving the information describing the search results, can re-process the request for content using the information. For example, the content management system 212 can identify other eligible content items, remove one or more previously eligible content items from a set of eligible content items, adjust a quality score or a bid associated with one or more eligible content items, or re-rank the eligible content items. As a particular example, the content management system 212 can identify a content item 226 as an eligible content item. The content item 226, which is related to fishing lures, may not have been identified as an eligible content item based on the search query 208 but may be identified as an eligible content item based on the search result 228 being a top-ranked search result that is related to a fishing lures company.

In some implementations, the content management system 212 re-runs an auction after re-processing the request for content, using the then-available eligible content items (e.g., after the addition, removal, or re-ranking of eligible content items). For instance, the example auction results include entries shown in rows three, four, and five, which correspond to a re-running of the auction for the request for content associated with the search request sent by the user device 202. Values of "N" for an initial auction column and values of "1" for an auction identifier column indicate that the entries in rows three, four, and five correspond to a re-running of the auction. The row three entry indicates that the content item 226 has a highest auction score (e.g., of ninety), as compared to auction scores for the content items 222 and 224 which are associated with rows four and five, respectively.

The content management system 212 can select the content item 226 in response to the request for content based on the content item 226 having a highest auction score and can transmit the content item 226 to the user device 204, for presentation in the content slot 213, as illustrated by presented content item 234. The search system 206 can transmit the identified search results to the user device 204, as illustrated by the presented search results 228, 230, and 232.

As another example, a user device 242 associated with a user 244 can send a search request to the search system 206, such as a request associated with a search query 248 (e.g., "concert tickets") entered on a search page 250 that is presented on the user device 242. In response to receiving the search request from the user device 242, the search system 206 can send a request for content to the content management system 212, for one or more content items to be presented along with search results in response to the search request, such as in a content slot 253. The request for content can include an indicator that further information, such as information relating to search results, may be subsequently made available for the selection of content items.

The content management system 212 can process the request for content associated with the search query 248, to evaluate the candidate content items 214 to identify one or more eligible content items. For example, the content management system 212 can identify content items 256 and 258. The content item 256 is for a discount concert ticket seller and the content item 258 is for a ticket seller that sells tickets for concerts and sporting events.

In some implementations, the content management 212 system ranks the identified eligible content items, such as based on a predicted rate of interaction (e.g., a predicted click-through rate) and/or based on a relevance of the content item to the search query 248. In some implementations, the content management system 212 conducts an auction using the eligible content items and ranks the eligible content items according to respective auction results.

For instance, the example auction results include rows six and seven, which show highest and second-highest auction results, respectively, for an auction conducted in response to the request for content associated with the search query 248. For example, the row six indicates that an auction with an identifier of "2", which was an initial auction for the content request, was conducted, for a user with an identifier of "244", for a content request with an identifier of "302", where a content item with an identifier of "256" (e.g., corresponding to the content item 256) received an auction score of "9.02" (e.g., where the auction score was determined as a product of a bid of 0.11 times a quality score of eighty two). The row seven indicates that for the auction with the identifier of "2", an auction result of 8.8 was determined, for the user with the identifier of "244", for the content request with the identifier of "302", for a content item with an identifier of "258" (e.g., corresponding to the content item 258). In this example, the content item 256 received the highest auction score, as indicated by the rectangle outlining the highest auction result of 9.02 in the auction result cell in the row six.

In response to receiving the search request corresponding to the search query 248, the search system 206 performs a search to identify a set of search results corresponding to the search query 248. For example, as shown in the search page 250, the search system 206 can identify search results 262, 264, and 266 (e.g., search results relating to "Singer A tour announced", "Discount concert tickets", and "Low-price tickets", respectively). The search system 206 can send information describing the search results to the content management system 212.

The content management system 212, in response to receiving the information describing the search results, can re-process the request for content associated with the search query 248 using the received information. For example, the content management system 212 can identify one or more other eligible content items, such as a content item 260 which is for a seller of "Singer A" memorabilia. The content item 260 can be identified, for example, based on a relevance to the search result 262.

As another example, the content management system 212 can remove an eligible content item from a set of eligible content items. For example, the content management system 212 can remove the content item 258 from a set of eligible content items, based, for example, on the content item 258 being less relevant to the search query 248 and the search results 262, 264, and 266 than the content item 256 and the content item 260. Relevance determinations can be based on a predetermined threshold or by other means.

In some implementations, the content management system 212 re-runs an auction after re-processing the request for content, using the then-available eligible content items (e.g., after the addition, removal, or re-ranking of eligible content items). For instance, the example auction results include rows eight and nine, which correspond to a re-running of the auction for the request for content associated with the search request sent by the user device 242. Values of "N" for the initial auction column and values of "2" for the auction identifier column indicate that the entries associated with rows eight and nine correspond to a re-running of the auction. The row eight entry indicates that the content item 260 has a highest auction score (e.g., of sixteen), as compared to an auction score for the content item 256 which is associated with the row nine.

The content management system 212 can select the content item 260 in response to the request for content based on the content item 260 having a highest auction score, and can transmit the content item 260 to the user device 242, for presentation in the content slot 253, as illustrated by a presented content item 268. The search system 206 can transmit the identified search results to the user device 242, as illustrated by the presented search results 262, 264, and 266.

As yet another example, a user device 272 associated with user 274 can send a search request to the search system 206, such as a request associated with a search query 278 (e.g., "gifts for men") entered on a search page 280 that is presented on the user device 272. In response to receiving the search request from the user device 272, the search system 206 can send a request for content to the content management system 212, for one or more content items to be presented along with search results in response to the search request, such as in a content slot 283. The request for content can include an indicator that further information, such as information relating to search results, may be subsequently made available for the selection of content items.

The content management system 212 can process the request for content associated with the search query 278, to evaluate the candidate content items 214 to identify one or more eligible content items. For example, the content management system 212 can identify content items 284, 285, and 286. The content item 284 is associated with a product of "ABC Sandals", the content item 285 is associated with "ZYX golf clubs", and the content item 286 is associated with a merchant named "the Tie Shop".

In some implementations, the content management 212 system ranks the identified eligible content items without conducting an auction and in some implementations the content management system 212 conducts an auction using the eligible content items and ranks the eligible content items according to respective auction results. For instance, the example auction results include entries associated with rows ten, eleven, and twelve, which show three auction results associated with the content items 284, 285, and 286, respectively, for an auction conducted in response to the request for content associated with the search query 278. In this example, the content item 285 received the highest auction score, as indicated by the rectangle outlining a highest auction result of 21 in the auction result cell in the row eleven. In some implementations, the content management system 212 can send the content item 285 and/or information describing the content item 285 to the search system 206, after determining that the content item 285 is an auction winning content item.

In response to receiving the search request corresponding to the search query 278, the search system 206 performs a search to identify a set of search results corresponding to the search query 278. For example, as shown in the search page 280, the search system 206 can identify search results 288, 289, and 290 (e.g., search results relating to "ABC sandals", "golf clubs", and "tools", respectively). The search system 206 can send information describing the search results to the content management system 212.

The content management system 212, in response to receiving the information describing the search results, can re-process the request for content associated with the search query 278 using the received information. For example, the content management system 212 can re-rank the eligible content items 284, 285, and 286, such as changing (i.e., boosting or reducing) a score associated with the content item 284 based on the search result 288, which can result in the content item 284 having a higher/lower rank than the previously highest/lowest ranked content item 285. The score change (e.g., boost) for the content item 284 can be based, for example, on the search system 206 being aware of a recent popularity in "ABC sandals" as evidenced by recent search result volume and as indicated by the search result 288 being a top-rated search result for the search query 278.

As another example, the content management system 212 can remove an eligible content item from a set of eligible content items. For example, the content management system 212 can remove the content item 286 from a set of eligible content items, based, for example, on the content item 286 being less relevant to the search query 278 and the search results 288, 289, and 290 than the content item 284 and the content item 286, such as due to a determined decrease among users in general of search result selections relating to ties for search queries such as the search query 278 and related queries.

The content management system 212 can select the content item 284 in response to the request for content associated with the search query 278 based on the content item 284 having a highest ranked score (e.g., after re-ranking), and can transmit the content item 284 to the user device 272, for presentation in the content slot 283, as illustrated by a presented content item 268. The search system 206 can transmit the identified search results to the user device 272, as illustrated by the presented search results 288, 289, and 290.

In some implementations, the search system 206 is configured to wait to send the search results 288, 289, and 290 and a content item for the content slot 283 to the user device 272 until after receiving a response from the content management system 212 to the sending of information describing the search results 288, 289, and 290 to the content management system 212. In some implementations, if the search system 206 does not receive a response from the content management system 212 (e.g., due to a communications error or delay), the search system 206 can send a content item selected before the search system sent the information describing the search results to the content management system 212. For example, the content item 285 may be selected for sending to the user device 272 based on the content item 285 winning an initial auction conducted in response to the request for content search query 278.

Figure 3:
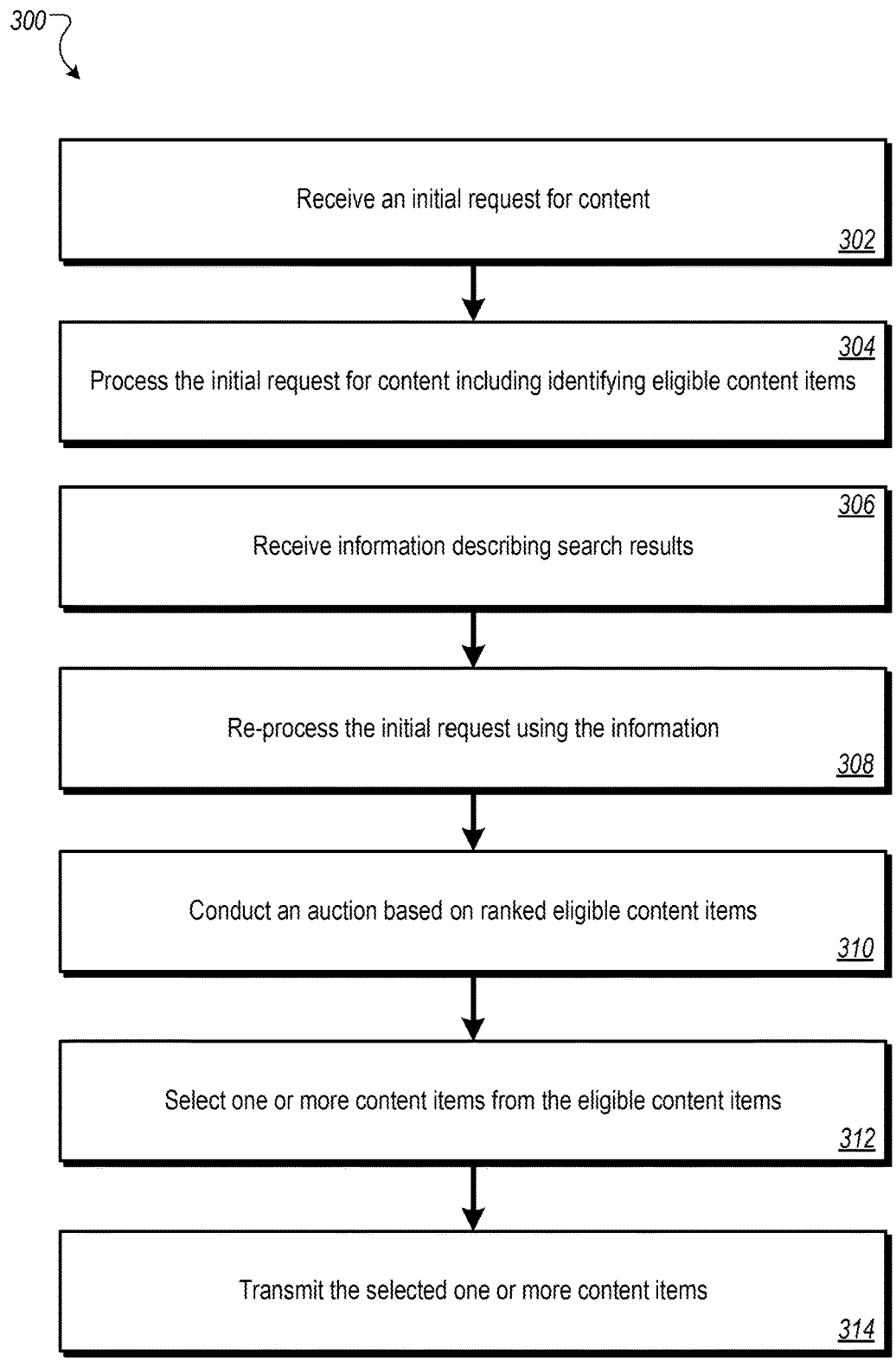
FIG. 3 is a flowchart of an example process for selecting content.

FIG. 3 is a flowchart of an example process 300 for selecting content. The process 300 can be performed, for example, by the content management system 110 described above with respect to FIG. 1 or the content management system 212 described above with respect to FIG. 2.

An initial request for content is received (302), wherein the content is to be presented along with search results responsive to a search request that is received from a user device and wherein the initial request includes one or more selection criteria for evaluating candidate content items. The initial request for content can be received, for example, by a search system configured to generate the search results. As another example, the initial request for content can be received by the user device. The initial request for content can include an indicator that further information will be made available for the selection of eligible content items. The further information can be, for example, the search results or information describing the search results.

The initial request is processed (304), by one or more processors, including identifying one or more eligible content items from the candidate content items that satisfy the initial request. The eligible content items can be, for example, advertisements or some other type of content. The processing of the initial request can include, for example, ranking the one or more eligible content items, such as according to the received selection criteria. In some implementations, an auction is conducted using the eligible content items and the eligible content items are ranked according to the auction results. Auction results and/or other rankings can be based, for example, on bid amounts and/or a quality score, which can be based at least in part, for example, on a predicted click through rate.

Information describing the search results is received after receiving and processing the initial request and identifying one or more eligible content items (306). The information describing the search results can include some or all of the following for each search result: a URL (Uniform Resource Locator) for a resource associated with the search result, information or content associated with the resource (e.g., indicating whether the resource includes one or more images or one or more video content items), a search result snippet, a search result title, one or more entities associated with the search result, map information, or a search result ranking. In some implementations, entire search results are received.

The initial request is re-processed using the information (308), including one or more of adding other eligible content items, removing one or more previously eligible content items, adjusting a quality score or a bid associated with one or more eligible content items, or re-ranking the eligible content items. Re-processing can include continuing processing and updating the processing (based on the newly received information). In some implementations, a quality score or bid of one or more content items can be adjusted upward or downward based on the information as part of the re-processing.

For example, a content sponsor can configure a campaign parameter for a content item such that if a resource associated with the content sponsor is included in one of the top N search results, where N is a predetermined positive integer (e.g., 5), a bid associated with the content item can be reduced (e.g., by a predetermined amount or a predetermined percentage). For example, the content sponsor may make such a configuration if the content sponsor is not as interested in paying for presentation of the content item if the search results already include information associated with the content sponsor. As another example, in some implementations, a content sponsor can configure a campaign parameter for a content item such that if a resource associated with a competitor is included in the search results, a bid for the content item can be increased (e.g., by a predetermined amount or a predetermined percentage).

An auction is conducted based on ranked eligible content items (310). Other selection means can be used. For example, an auction associated with the request for content can be re-run with one or more of quality scores or bids associated with a given eligible content item being adjusted based on the received information.

One or more content items are selected from among the eligible content items responsive to the initial request (312), based at least in part on the results of the auction. For example, a content slot associated with the request for content can be allocated to a content sponsor according to a highest auction score. When multiple content slots are associated with the request for content, the slots can be allocated to a set of bidders that provided the highest bids or have the highest auction scores. In some implementations, a selection from among the eligible content items is finalized only after receipt of the information describing the search results.

The selected one or more content items are transmitted (314). For example, the content management system or, in some implementations, the search system, can transmit the one or more content items to the user device, for presentation along with search results that are responsive to the search request.

Figure 4:
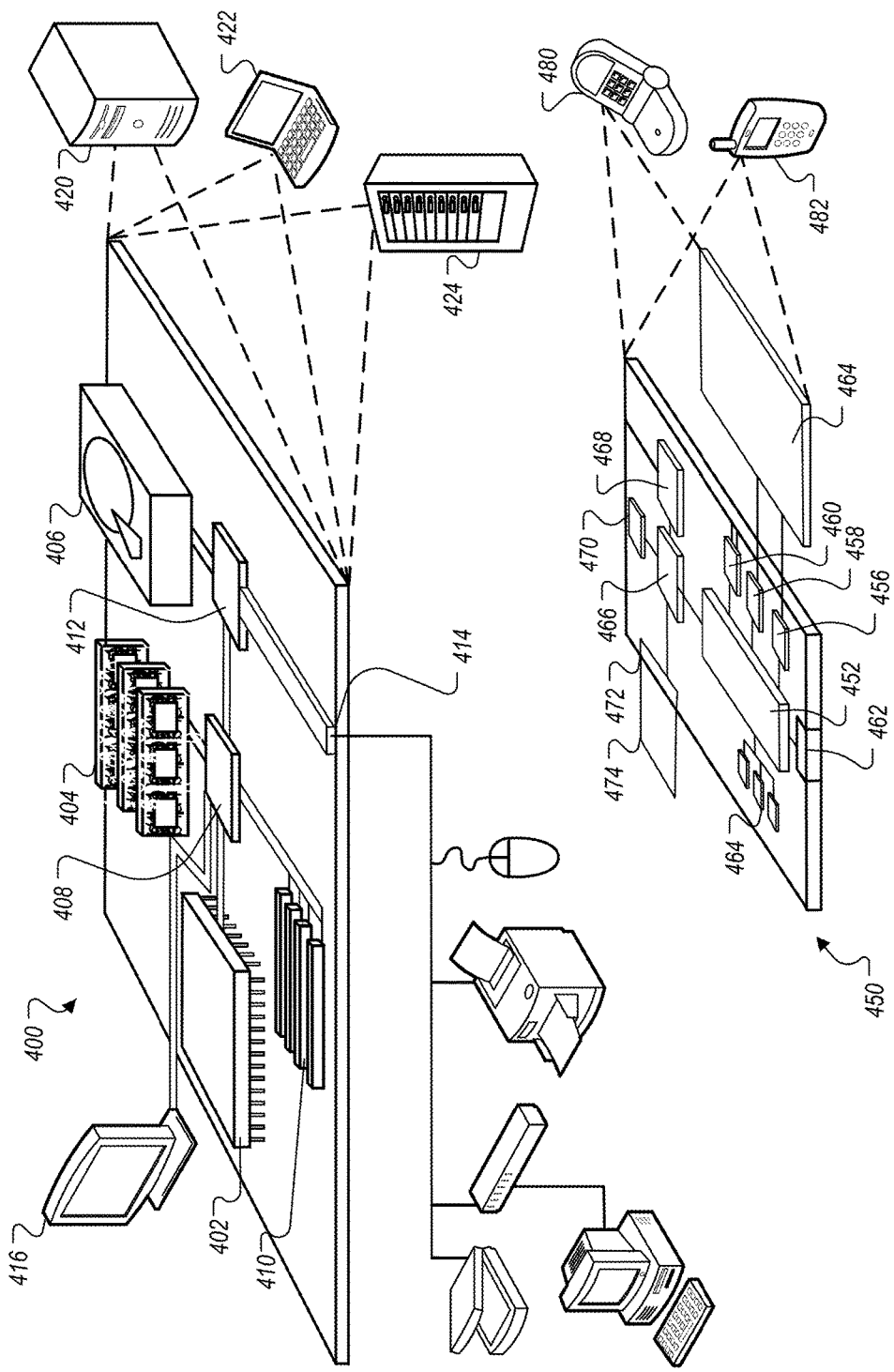
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. The computer-readable medium is not a propagating signal. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is illustrative only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
for each of multiple search requests:
receiving a search request that was submitted through a search control presented at a remotely located user device;
processing, by a search computing system, the search request to locate search results;
while processing the search request and prior to obtaining information about the search results, processing, by one or more servers and based at least on a query included in the search request, an initial request to obtain content that is to be presented along with the search results at the remotely located user device, including identifying, by a content identification computing system that includes the one or more servers and that that is in communication with the search computing system, two or more eligible content items using at least the query, wherein the two or more eligible content items are not the same as the search results and the two or more eligible content items are ranked based on their relevance to the query;
after receiving and processing the initial request and identifying the two or more eligible content items, receiving, by the one or more servers, information describing the search results, including information specifying a highest ranked content item based on the relevance to the query;
re-processing, by the one or more servers, the initial request using the information, the re-processing including modifying rankings of the two or more eligible content items based, at least partially, on their relevance to the information describing the search results; and selecting, by the one or more servers, a given content item from among the two or more eligible content items that were identified using the initial request, wherein the selecting is performed based on the modified rankings of the two or more eligible content items;

for a first search request, transmitting, by the one or more servers, the given content item that was selected based on the modified rankings rather than the highest ranked content item from the two or more eligible content items that were identified and ranked using the query prior to obtaining information about the search results based on the re-processing and selecting being completed prior to the search computing system sending the search results to the remotely located user device in response to the first search request; and for a second search request, transmitting, by the one or more servers, the highest ranked content item from the two or more eligible content items that were identified and ranked using the query prior to obtaining information about the search results rather than the given content item based on the re-processing and selecting still being performed by the one or more servers when the search computing system sends the search results to the remotely located user device in response to the second search request.

2. The method of claim 1 wherein the information includes the search results.

3. The method of claim 1 wherein processing includes ranking the eligible content items and re-processing includes adding or removing one or more content items from the two or more eligible content items and re-ranking the then eligible content items.

4. The method of claim 1 wherein re-processing includes adjusting a quality score of one or more content items upward or downward based on the information.

5. The method of claim 1 wherein re-processing includes adjusting a bid associated with one or more eligible content items based at least in part on the information.

6. The method of claim 1 wherein processing includes conducting an auction and re-processing includes re-running an auction based on the then available eligible content items.

7. The method of claim 6 wherein re-running an auction includes re-running the auction with a bid associated with a given eligible content item being adjusted based on the received information.

8. The method of claim 1 wherein the initial request includes an indicator that further information will be made available for the selection of eligible content items.

9. The method of claim 1 further comprising finalizing a selection from among the two or more eligible content items only after receipt of the information.

10. A system comprising:
one or more processors; and
one or more memory elements including instructions that when executed cause the one or more processors to:
for each of multiple search requests:
receive a search request that was submitted through a search control presented at a remotely located user device;
process, by a search computing system, the search request to locate search results;
while processing the search request and prior to obtaining information about the search results, process, by one or more servers and based at least on a query included in the search request, an initial request to obtain content that is to be presented along with the search results at the remotely located user device, including identifying, by a content identification computing system that is in communication with the search computing system, two or more eligible content items using at least the query, wherein the two or more eligible content items are not the same as the search results and the two or more eligible content items are ranked based on their relevance to the query;

after receiving and processing the initial request and identifying the two or more eligible content items, receive, by the one or more servers, information describing the search results, including information specifying a highest ranked content item based on the relevance to the query;

re-process, by the one or more servers, the initial request using the information, the re-processing including modifying rankings of the two or more eligible content items based, at least partially, on their relevance to the information describing the search results; and select, by the one or more servers, a given content item from among the two or more eligible content items that were identified using the initial request, wherein the selecting is performed based on the modified rankings of the two or more eligible content items;

for a first search request, transmit, by the one or more servers, the given content item that was selected based on the modified rankings rather than the highest ranked content item from the two or more eligible content items that were identified and ranked using the query prior to obtaining information about the search results based on the re-processing and selecting being completed prior to the search computing system sending the search results to the remotely located user device in response to the first search request; and for a second search request, transmit, by the one or more servers, the highest ranked content item from the two or more eligible content items that were identified and ranked using the query prior to obtaining information about the search results rather than the given content item based on the re-processing and selecting still being performed by the one or more servers when the search computing system sends the search results to the remotely located user device in response to the second search request.

11. The system of claim 10 wherein the system is configured to finalize a selection from among the two or more eligible content items only after receipt of the information.

12. The system of claim 10 wherein the information includes the search results.

13. The system of claim 10 wherein to process the initial request the content management system is configured to rank the two or more eligible content items and wherein to re-process the initial request the content management system is configured to add or remove one or more content items from the two or more eligible content items and re-rank the then eligible content items.

14. The system of claim 10 wherein to re-process the initial request the content management system is configured to adjust a quality score of one or more content items upward or downward based on the information.

15. A computer program product tangibly embodied in a computer-readable storage device and comprising instructions that, when executed by a processor, cause the processor to:

for each of multiple search requests:
    receive a search request that was submitted through a search control presented at a remotely located user device;
    process, by a search computing system, the search request to locate search results;
    while processing the search request and prior to obtaining information about the search results, process, by one or more servers and based at least on a query included in the search request, an initial request to obtain content that is to be presented along with the search results at the remotely located user device, including identifying, by a content identification computing system that is in communication with the search computing system, two or more eligible content items using at least the query, wherein the two or more eligible content items are not the same as the search results and the two or more eligible content items are ranked based on their relevance to the query;
    after receiving and processing the initial request and identifying the two or more eligible content items, receive, by the one or more servers, information describing the search results, including information specifying a highest ranked content item based on the relevance to the query;
    re-process, by the one or more servers, the initial request using the information, the re-processing including modifying rankings of the two or more eligible content items based, at least partially, on their relevance to the information describing the search results; and
    select, by the one or more servers, a given content item from among the two or more eligible content items that were identified using the initial request, wherein the selecting is performed based on the modified rankings of the two or more eligible content items;

for a first search request, transmit, by the one or more servers, the given content item that was selected based on the modified rankings rather than the highest ranked content item from the two or more eligible content items that were identified and ranked using the query prior to obtaining information about the search results based on the re-processing and selecting being completed prior to the search computing system sending the search results to the remotely located user device in response to the first search request; and for a second search request, transmit, by the one or more servers, the highest ranked content item from the two or more eligible content items that were identified and ranked using the query prior to obtaining information about the search results rather than the given content item based on the re-processing and selecting still being performed by the one or more servers when the search computing system sends the search results to the remotely located user device in response to the second search request.

16. The product of claim 15 wherein a selection is finalized from among the two or more eligible content items only after receipt of the information.

17. The product of claim 15 wherein the information includes the search results.

18. The product of claim 15 wherein processing the initial request includes ranking the two or more eligible content items and re-processing the initial request includes adding or removing one or more content items from the two or more eligible content items and re-ranking the then eligible content items.

19. The product of claim 15 wherein re-processing the initial request includes adjusting a quality score of one or more content items upward or downward based on the information.

* * * * *